Figure 1:
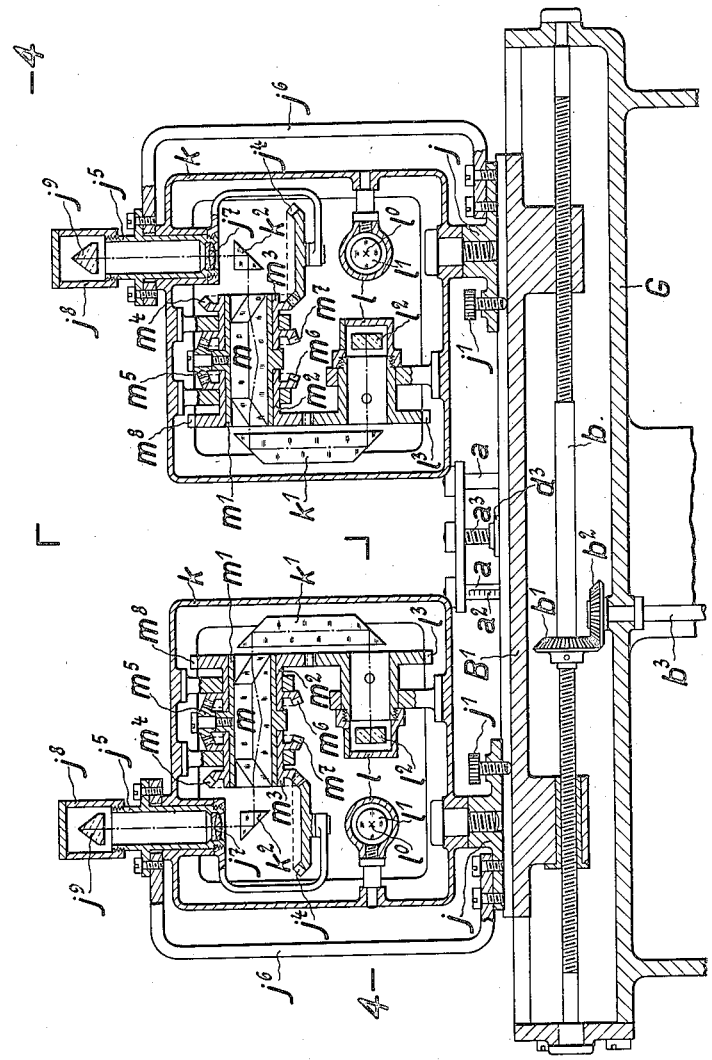

Patented Dec. 25, 1923.

1,478,693

UNITED STATES PATENT OFFICE.

WALTHER BAUERSFELD, OF JENA, GERMANY, ASSIGNOR TO THE FIRM CARL ZEISS, OF JENA, GERMANY.

COPYING DEVICE.

Application filed July 18, 1922. Serial No. 575,862.

*To all whom it may concern:*

Be it known that I, WALTHER BAUERSFELD, a citizen of the German Empire, and residing at Jena, Germany, have invented a new and useful Copying Device (for which I have filed an application in Germany, July 18, 1921), of which the following is a specification.

The present invention relates to a device for copying the surface, to be obtained from a photostereogram, of a spatial form which device is constructed as follows. A copying device contains a copy carrier and a tool which are movable relatively to each other at least in a plane. Each of two photo-carriers carries one of the two photograms and an objective disposed in the centre of projection of this photogram. A mark system and the two photo-carriers are disposed in space displaceably relatively to each other and their relative displacements are transmitted to the copying device in such a way that the mark system is seen with the aid of a binocular observation system as coinciding at any one time with those two image-points which correspond on the two photograms to the object point indicated by the tool-point on the copy-carrier.

Such a device has, e. g. become known by the patent specification 1138347. In the constructional examples described in this patent specification the simple case has been supposed that the photograms had been taken with objectives having a horizontal axial direction. In order to use such a device for utilizing photograms, during the exposure of which the objective-axes had been optionally directed into space, according to the present invention for the purpose of sharply imaging the mark system and the two photograms there is inserted between each photogram and the mark system a lens system, of which at least one member, dependent upon the distance of the mark system from the objective appertaining to the respective photogram, undergoes an adjustment in the direction of its optical axis. With a view to prevent this lens system from affecting the measurement by its unavoidable distortion, it is coupled to the mark system and the appertaining photo-carrier in such a manner as to participate in changes of inclination of the appertaining sighting line and to occupy at the same time such a position relatively to this sighting line that its optical axis and this sighting line almost coincide. The lens system is suitably disposed between the appertaining objective and the mark system. If this lens system consists of several members and be supported universally rotatably about a point, it is, in order to render harmless deviations of its optical axis from the appertaining sighting line, devised and disposed in such a way that its point of rotation coincides with its principal point facing the mark system, independently of the position which its members occupy relatively to each other at any one time. In order that, furthermore, as little light as possible will be lost, the lens system is so disposed that its point of rotation coincides with the principal point, facing the mark system, of the appertaining objective.

With a view to be independent of the dimensions of the photo-carriers when selecting the scale of the copy, the mark system is suitably so constructed as to consist of two members which are disposed at a distance apart, invariable during the copying, in such a way that each of them can only be seen in the binocular observation system as coinciding with one of the two photograms. This distance may be so chosen that a sufficient working space is attained.

If, in addition, the device be provided with three principal slides which are to be actuated by the observer and of the directions of displacement of which two are perpendicular to each other and the third is perpendicular to the two others, the displacement, required whilst copying, of the two members of the mark and of the two photo-carriers relatively to each other in space can be either attained by rigidly disposing the one pair and by imparting the whole displacement to the other pair alone, or by dividing the displacements among both pairs at option. A particularly favourable constructional form is attained if two of these three principal slides be united to a cross slide system, carrying on its top slide the two photo-carriers, and if the two members of the mark be disposed on the third principal slide.

By choosing the direction of displacement of the bottom slide of the cross-slide system in such a way that this slide adjusts the distance apart of the two photo-carriers and of the two members of the mark, it is possible to copy on different scales by adjustably disposing relatively to each other the members of one of these two pairs in the direction of displacement of the top slide of the cross slide system and the members of the same or of the other pair in the direction of displacement of the third principal slide. With a view to be able to take into consideration the relative position of the photograms during the exposure, each of the two photo-carriers should be in Cardan suspension on the slide, carrying it, in such a way that its Cardan centre almost coincides with the principal point, facing the mark system, of its objective. By also rendering the members of one of those two pairs adjustable relatively to each other in the direction of displacement of the bottom slide of the cross slide system, only the one photo-carrier need be in Cardan suspension, whilst for the other photo-carrier only a rotation about a single axis need be provided for in such a way that this rotation corresponds to the inclination of the objective-axis, adjusted for during the exposure of the appertaining photogram. A particularly compact structure of the device may be attained by providing for the Cardan suspension of both photo-carriers also in this case and by adjustably disposing each of both members of that of the said both pairs in which the direction of the relative adjustment of the two members coincides with the direction of displacement of that principal slide which controls the relative displacement of the space-mark corresponding to the two members of the mark with binocular observation and of the spatial form corresponding to the two photograms, in the breadth-direction of this form.

In order that the two photograms can be adjusted according to the slant existing during their exposure, it is necessary to dispose each photogram relatively to the appertaining objective rotatably about the optical axis of the latter. For constructional reasons it is advisable to dispose the entire photo-carrier rotatably about the axis of its objective, so that the objective participates in the rotation of the photogram.

For the purpose of the simultaneous binocular observation of the members of the mark and of the photograms each of these members may either be imaged on the appertaining photogram, or the image-point adjusted for at any one time into the appertaining mark-plane, or finally the image point adjusted for at any one time with the appertaining member of the mark into a third plane. To the first case there corresponds an observation from the side of the photograms, to the other two cases an observation from the side of the marks.

A particularly simplified binocular observation instrument is obtained if the second of these three cases is applied. In that case each half of the instrument is suitably provided between the appertaining member of the mark and the ocular with a reflector system which consists of two groups of reflectors disposed in succession. These groups are supported on the slide carrying this member of the mark, viz, the front group, facing the appertaining photo-carrier, in Cardan suspension in such a way that its Cardan centre contains this member of the mark, and the rear group, facing the appertaining ocular, rotatably about an axis coinciding with the outer Cardan axis of the front group of reflectors. In addition, the two groups of reflectors are so coupled as to be capable of rotating about this common axis of rotation only through the same angle, and the position of the reflecting surfaces is chosen in such a way that the appertaining sighting line, on leaving the rear group of reflectors, is parallel to the axis of rotation of this group. With a view to present to the observer a stationary image, independently of rotations of the group of reflectors, there is introduced into the path of rays of each half of the observation instrument an erecting prism which is coupled to the two groups of reflectors in such a way as to experience a rotation through half the angle both with rotations of the front group of reflectors about its inner Cardan axis and with rotations of both groups of reflectors about their common axis of rotation. If the direction of displacement of the third of the three principal slides to be actuated by the observer be so chosen that this slide adjusts the displacement of the space-mark, corresponding to both members of the mark with binocular observation, relatively to the spatial form, corresponding to the two photograms, in the breadth-direction of this form, it is possible to attain a firm position for the oculars by introducing into the path of rays between each rear group of reflectors and the appertaining ocular an arrangement of link-prisms.

In the event of using a two-membered mark-system it is possible, instead of disposing the two members of the mark in such a way that they determine directly the position of the sighting lines, to arrange them in such a manner that they lie themselves outside the path of rays available during the observation and that their reflected images are effective. For this purpose each of the two members of the mark could, e. g. be disposed adjacent to one of the two objectives of the photo-carrier in such a way that the reflected image of the member of the mark, produced by a reflector semi-pervious to light and lying behind this objective, is situated in the object-principal point of this objective, and presents the respective member of the mark to a central reflector by means of the above reflector. To the binocular instrument there would then have suitably to be applied the first of the aforesaid three cases in which each member of the mark is imaged on the appertaining photogram and the observation takes place from the side of the photogram.

Figure 2:
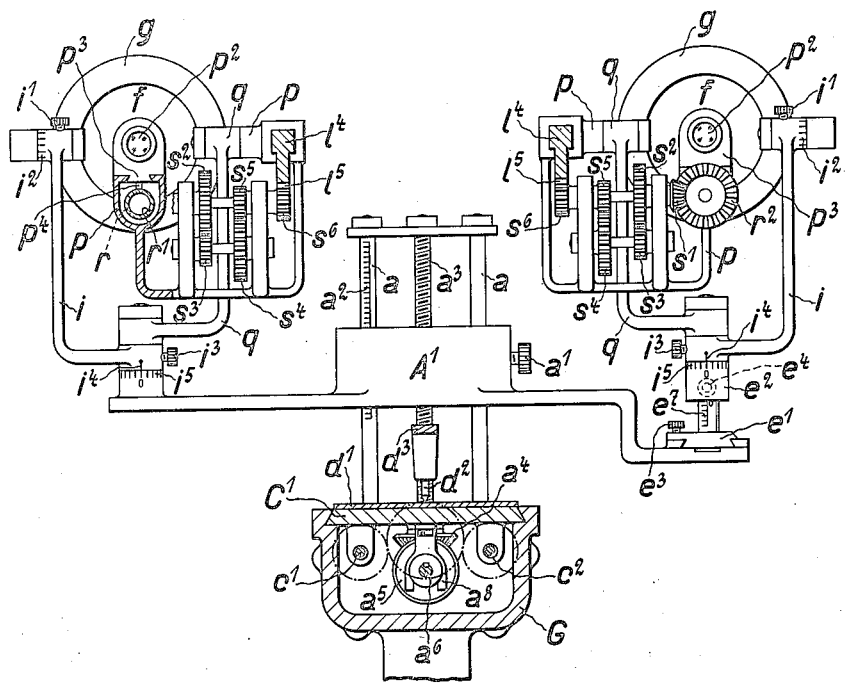
Figure 3:
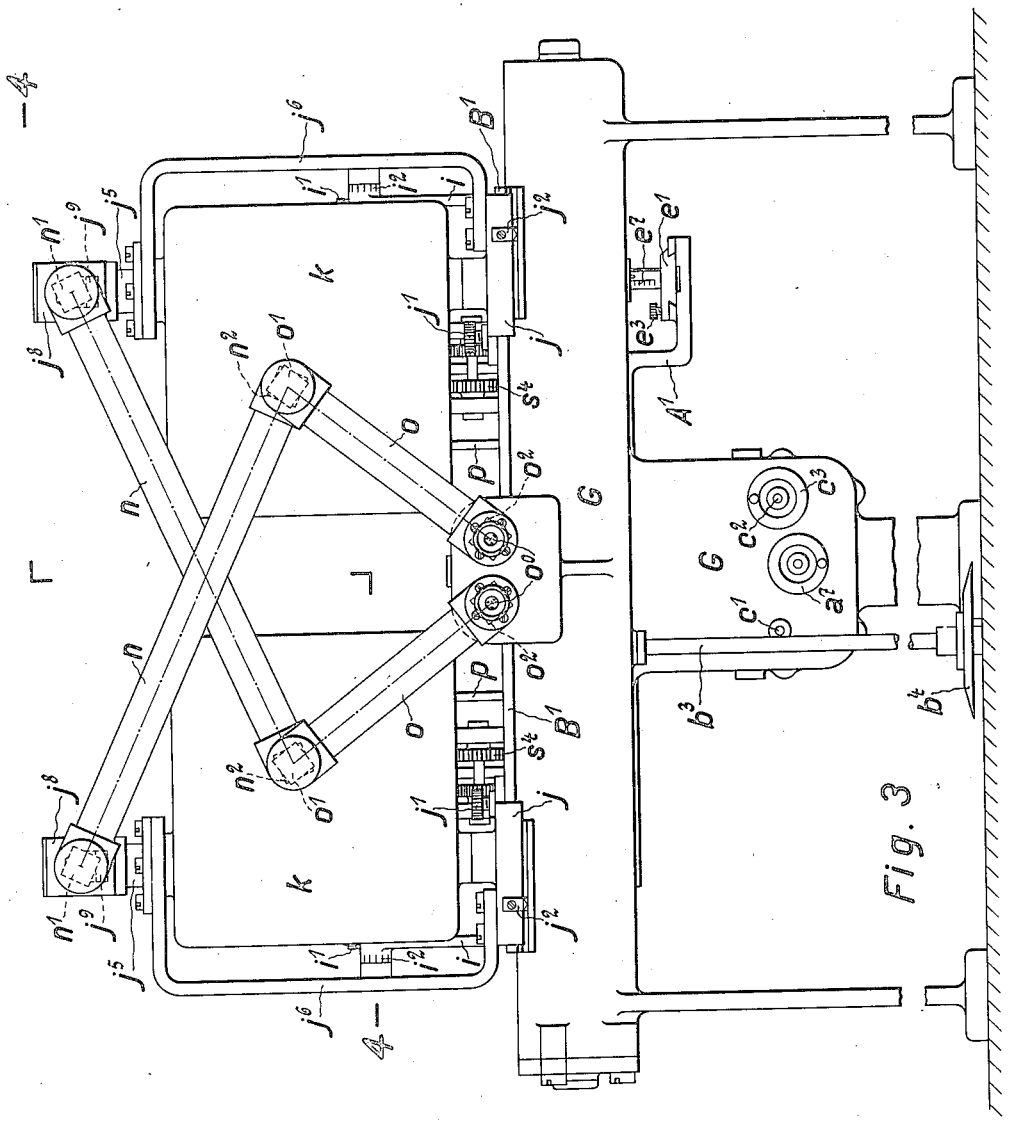
Figure 4:
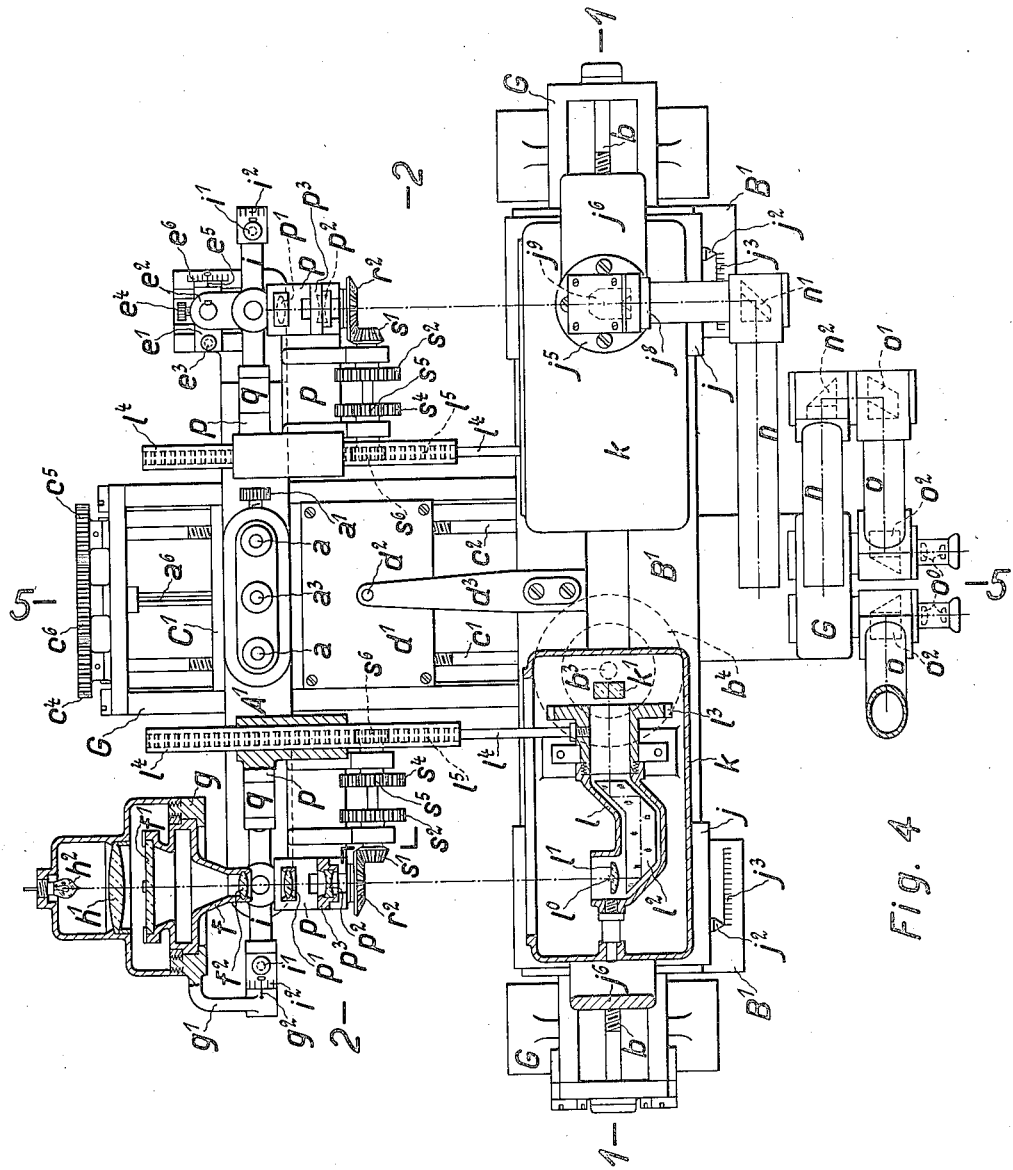
Figure 5:
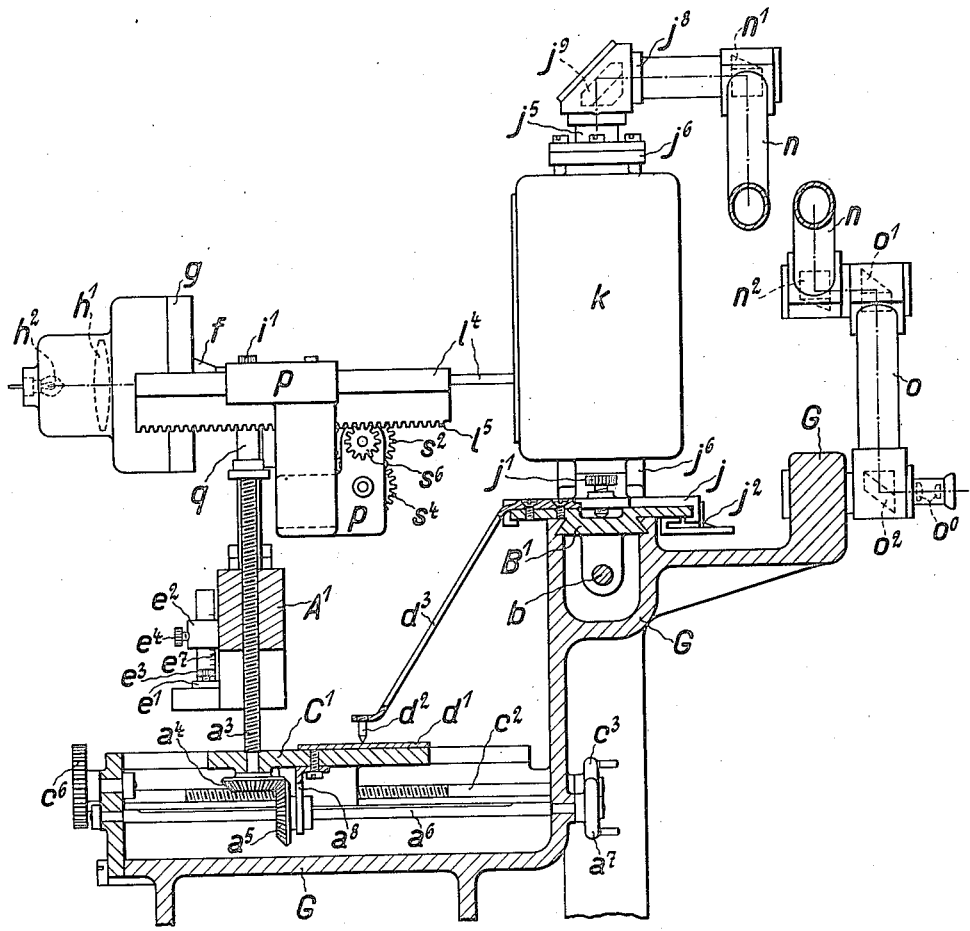

Figs. 1 to 5 show a constructional example of a device according to the invention for copying linear elements of the surface, to be obtained from a photostereogram, of a spatial form upon a plane surface. Figs. 1 and 2 are elevations in section, Fig. 3 is a front elevation, Fig. 4 is a plan elevation, partly in section and Fig. 5 is a side elevation in section.

On a base plate G there is disposed a system of three principal slides $A^1$, $B^1$ and $C^1$. The slides $B^1$ and $C^1$ are displaceable each on the base plate along two guide-bars in such a way that their directions of displacement are perpendicular to each other, whilst the slide $A^1$ is displaceable on the slide $C^1$ along two guide-bars $a$ in such a way that its direction of displacement is perpendicular to both that of the slide $B^1$ and that of the slide $C^1$. The slide $A^1$ can be fixed relatively to the slide $C^1$ by means of a set screw $a^1$ and its upper edge indicates on a scale $a^2$ of the one guide-bar the position adjusted for at any one time. The slide $A^1$ is actuated by means of a thread-spindle $a^3$ rotatably supported on the slide $C^1$, the rotation of this spindle being started by means of a pair of bevel wheels $a^4$, $a^5$ by a grooved shaft $a^6$ which is rotatably supported on the base plate G and on which a hand wheel $a^7$ is fixed. The meshing of the bevel wheels $a^4$ and $a^5$ with each other is secured by a fork-shaped stud $a^8$ which is fixed to the slide $C^1$ and engages in the nave of the wheel $a^5$ displaceable along the grooved shaft $a^6$. The slide $B^1$ is actuated by a spindle $b$, provided with a thread and being rotatably supported on the base plate G and, furthermore being rotatable by means of a pair of bevel wheels $b^1$, $b^2$, a shaft $b^3$ and a foot-disc $b^4$ fixed to the latter. The slide $C^1$ engages in two spindles $c^1$ and $c^2$ having the same thread, which spindles are rotatably supported on the base plate G and the one of which, $c^2$, carries a hand-wheel $c^3$. With a view to impart, when actuating this hand-wheel, to both spindles $c^1$ and $c^2$ like rotations in the same directions, the spindles $c^1$ is wedged with a toothed wheel $c^4$ and the spindle $c^2$ with a toothed wheel $c^5$. Both toothed wheels are alike and engage in a third toothed wheel $c^6$ which is supported on the base plate G. To the slide $C^1$ there is fixed a drawing board $d^1$ in such a manner that the drawing plane is perpendicular to the direction of displacement of the slide $A^1$. The appertaining drawing pin $d^2$ is fitted to an arm $d^3$ rigidly connected with the slide $B^1$.

The slide $A^1$ (vide Figs. 2 and 4) carries a cross-slide arrangement, consisting of a slide $e^1$ adjustable in the direction of displacement of the slide $C^1$ and a slide $e^2$ adjustable on this slide $e^1$ in the direction of displacement of the slide $A^1$. The slide $e^1$ can be fixed on the slide $A^1$ by means of a set screw $e^3$ and the slide $e^2$ on the slide $e^1$ by means of a set screw $e^4$. The position, adjusted for at any one time, of the slide $e^1$ relatively to the slide $A^1$, is indicated on a scale $e^6$ of the slide $A^1$ by a pointer $e^5$ of the slide $e^1$, whilst the position, adjusted for at any one time, of the slide $e^2$ relatively to the slide $e^1$ is indicated on a scale $e^7$ of the slide $e^1$ by the upper edge of the slide $e^2$. On the slide $A^1$ two photo-carriers $f$, each of which contains a photogram $f^1$ and an objective $f^2$, lying in the centre of projection of this photogram, are disposed as follows. Each photo-carrier $f$ is supported rotatably about the axis of its objective $f^2$ within a bearing body $g$ to which an illuminating device $h^1$, $h^2$ for the photogram $f^1$ of the photo-carrier is fixed. Each bearing body is supported on an arm $i$ by means of an arm $g^1$ rotatably about an axis, parallel to the drawing plane and containing the front principal point of the appertaining objective $f^2$. With the aid of a set screw $i^1$ it can be fixed relatively to the arm $i$. In addition, a pointer $g^2$ of the arm $g^1$ indicates on a scale $i^2$ of the arm $i$ the position, adjusted for at any one time, of the bearing body $g$ relatively to the arm $i$. Each of the two arms $i$ for the two bearing bodies is supported rotatably about an axis, parallel to the direction of displacement of the slide $A^1$ and intersecting the axis of rotation of the appertaining bearing body in the front principal point of the appertaining objective $f^2$, viz. the one arm directly upon the slide $A^1$, the other one upon the slide $e^2$. Each arm $i$ can be fixed on the slide carrying it by means of a set screw $i^3$. Besides, a pointer $i^4$ of the arm $i$ indicates on a scale $i^5$ of the slide carrying it the position, adjusted for at any one time, of the arm $i$ relatively to the slide carrying it. In the annexed drawing the pointers $g^2$ and $i^4$ indicate each on the appertaining scale the value zero, the axes of the objectives $f^2$ being parallel to the direction of displacement of the slide $C^1$. Also the slides $e^1$ and $e^2$ are set to zero in the drawing, the connecting line of the front principal points of the two objectives $f^2$ being parallel to the direction of the displacement of the slide $B^1$.

On the slide $B^1$ two slides $j$ (vide Figs. 1, 4 and 5) are displaceably disposed in such a way that their directions of displacement coincide with the direction of displacement of the slide $B^1$. Each of the two slides $j$ can be fixed on the slide $B^1$ by means of a set screw $j^1$. The position, adjusted for at any one time, of each of the two slides $j$ relatively to the slide $B^1$ is indicated by a pointer $j^2$ on a scale $j^3$ of the slide $B^1$. On each of the two slides $j$ a casing $k$ is supported rotatably about an axis parallel to the direction of displacement of the slide $A^1$. The plane determined by the axes of rotation of both casings $k$ is parallel to the direction of displacement of the slide $B^1$ and in the event of the slides $j$ being in their zero position, as shown in the annexed drawing, the distance apart of the axes of rotation is equal to that, existing in the zero position of the slides $e^1$ and $e^2$, of the front principal points of the objectives $f^2$. Each of the two casings $k$ serves for receiving optical members of one of both halves of a binocular observation instrument. The arrangement of the optical members in each casing $k$ is as follows. A frame $l$ is rotatably supported within the casing $k$ in such a way that its axis of rotation perpendicularly intersects that of the casing. In the frame $l$ there is rigidly disposed a collective lens $l^1$ in such a manner that its optical axis perpendicularly intersects the axis of rotation of the frame $l$ in the point of intersection of the same with the axis of rotation of the casing $k$. The boundry surface of the collective lens, facing the appertaining objective $f^2$, contains this point of intersection and is provided within the same with a sighting mark $l^0$. In addition, the frame $l$ contains a prism $l^2$ which deflects three times the optical axis of the collective lens $l^1$ in one and the same plane in such a way that, on leaving the prism $l^2$, it coincides with the axis of rotation of the frame $l$. Within the casing $k$ an amici prism $k^1$ and a single reflecting prism $k^2$ are so fixed that a luminous ray which, on leaving the prism $l^2$, coincides with the axis of rotation of the frame $l$, coincides, when leaving the prism $k^2$, with the axis of rotation of the casing $k$. In order to avoid an inversion of the image arising with the displacements of the frame $l$ and of the casing $k$, an erecting prism $m$ is inserted between the prisms $k^1$ and $k^2$ into the path of rays. This prism rests within a bush $m^1$ which is rotatably supported on the casing $k$ with the aid of two adjacent bushes $m^2$ and $m^3$ in such a way that its axis of rotation is parallel to that of the frame $l$ and intersects that of the casing $k$. The bush $m^3$ engages by means of a bevel gear system $m^4$ in a bevel wheel $j^4$, the ratio of gearing being 1:1. The bevel wheel $j^4$ is fixed on a tubular body $j^5$ which rests on an arm $j^6$, rigidly connected with the slide $j$. On the bush $m^1$ a bevel wheel $m^5$ is rotatably supported in such a manner that its axis of rotation perpendicularly intersects that of the bush $m^1$. This wheel engages two uniform bevel gear systems, the axes of which coincide with the axis of rotation of the bush $m^1$ and of which the one, $m^6$, belongs to the bush $m^2$ and the other one, $m^7$, to the bush $m^3$. In order that with displacements of the frame $l$ about its axis of rotation the bush $m^2$ experiences the same rotations in the opposite direction about its own axis of rotation, a gearing $m^8$ of the bush $m^2$ engages in a similar gearing $l^3$ of the frame $l$. Within the tubular body $j^5$ a reversing lens $j^7$ is fixed in such a way that its optical axis coincides with the axis of rotation of the casing $k$. Besides, to the tubular body $j^5$ there is screwed a tubular body $j^8$, which contains a ridge-prism $j^9$ in such a position that the optical axis of the reversing lens $j^7$ is deflected into the direction of displacement of the slide $C^1$. On the tubular body $j^8$ there is rotatably supported a tubular body $n$. Another tubular body $o$ is rotatably supported at its one end on this tubular body $n$ at its other end on the baseplate $G$. All axes of rotation of the tubular bodies $n$ and $o$ are parallel to the direction of displacement of the slide $C^1$. The tubular body $n$ contains two single reflecting prisms $n^1$ and $n^2$, the tubular body $o$ two single reflecting prisms $o^1$ and $o^2$ as well as an ocular $o^0$, the optical axis of which coincides with the axis of rotation of the tubular body $o$ on the base-plate $G$. In addition, the prisms $n^1$, $n^2$, $o^1$ and $o^2$ are so disposed within the tubular body as to always deflect the optical axis of the reversing lens $j^7$, deflected by the ridge-prism $j^9$, in such a way that it finally coincides with the optical axis of the ocular $o^0$.

On the slide $A^1$ there are further disposed two lens-carriers $p$ in the following way. Each lens-carrier is supported rotatably on an arm $q$ about an axis, parallel to the drawing plane and containing the front principal point of the appertaining objective $f^2$. Each of the two arms $q$ is supported rotatably about an axis, parallel to the direction of displacement of the slide $A^1$ and intersecting the axis of rotation of the appertaining lens-carrier in the front principal point of the appertaining objective $f^2$, viz. the one directly on the slide $A^1$, the other one on the slide $e^2$. Upon each of the two lens-carriers $p$ a collective lens $p^1$ is fixed in such a way that its optical axis perpendicularly intersects the axis of rotation of the lens body $p$ in the front principal point of the appertaining objective $f^2$, and a dispersive lens $p^2$ displaceably disposed in such a way that its optical axis always coincides with that of the collective lens $p^1$. In order that the common optical axis of the lenses $p^1$ and $p^2$ always coincides with the optical axis with the appertaining collective lens $l^1$, there is fixed to each frame $l$ a guide-bar $l^4$, along which the appertaining lens-carrier $p$ can slide. In order to impart to each dispersive lens $p^2$, dependently upon the distance, adjusted for at any one time, of the appertaining sighting mark $l^0$ from the front principal point of the appertaining objective $f^2$, the requisite adjustment for sharply imaging the appertaining photogram into the mark-plane, the following arrangement has been provided for. The dispersive lens $p^2$ is fixed on a slide $p^3$ which is guided on the lens-carrier $p$ in the direction of the optical axis of the dispersive lens. The slide $p^3$ engages by means of a pin $p^4$ in a screw-shaped groove $r$ of a bush $r^1$ which is supported rotatably on the lens-carrier $p$ about an axis parallel to the direction of displacement of the slide $p^3$. With displacements of the lens-carrier $p$ along the guide-bar $l^4$ the bush $r^1$ is rotated with the aid of a pair of bevel wheels $r^2$, $s^1$, two pairs of spur gear wheels $s^2$, $s^3$ and $s^4$, $s^5$ and a toothed wheel $s^6$, the latter engaging in a gearing $l^5$ of the bar $l^4$, in such a way that the dispersive lens $p^2$ experiences the requisite displacement.

The adjustments required for rendering the device ready for use depend upon the position assumed of the spatial co-ordinate system, determined by the directions of displacements of the three principal slides $A^1$, $B^1$ and $C^1$, relatively to the base-line used for the exposure. If, e. g. it be assumed that the direction of displacement of the slide $C^1$, the depth-direction, be the bisecting line of the angle which, during the exposure of the photograms to be utilized, has been embraced by the horizontal projections of the objective-axes (this angle is hereafter denoted as convergent angle), that furthermore the direction of displacement of the slide $B^1$, the breadth-direction, be the horizontal line perpendicular to this bisecting line of the angle and that finally the direction of displacement of the slide $A^1$ be the vertical line perpendicular to this bisecting line, the following adjustments will be required. The two arms $i$ are to be so adjusted that the pointer $i^4$ of each arm indicates on the appertaining scale $i^5$ half of the convergent angle, and the two bearing bodies $g$ in such a manner that the pointer $g^2$ of the bearing body disposed on the right (left) in front of the observer indicates on the appertaining scale $i^2$ the angle which the axis of the objective used during the exposure at the left (right) station has embraced with the horizontal plane. Into the bearing body $g$, situated on the left (right) of the observer a photo-carrier $f$ is to be inserted which contains as the photogram $f^1$ the negative corresponding to the exposure at the right (left) station and the objective of which $f^2$ is like the right (left) objective used for exposure. In addition, the slanting of the photograms must be the same as during the exposure. The slide $e^1$ should be adjusted in such a way that its pointer $e^5$ indicates on the scale $e^6$ the horizontal projection, measured in the scale of the copy, of that length which during the exposure of the photograms comes about by projecting the base-line on the vertical plane containing the bi-secting line of the convergent angle and the slide $e^2$ in such a way that its upper edge indicates on the scale $e^7$ the difference of height, measured in the scale of the copy, of the two stations used for exposure. The two slides $j$ are to be so adjusted that the pointer $j^2$ of each of them indicates on the appertaining scale $j^3$ half of the horizontal projection, measured in the scale of the copy, of that length which during the exposure of the photograms comes about by projecting the base-line on a plane perpendicular to the bisecting line of the convergent angle. The set screws $e^3$, $e^4$, $i^1$, $i^3$ and $j^1$ having then been fixed, the device is ready for use.

With a view to trace in plan any desired lines of the surface of the spatial form corresponding to the two photograms, the observer must actuate the three principal slides $A^1$, $B^1$ and $C^1$ by means of the hand wheels $a^7$ and $c^3$ and the foot disc $b^4$ in such a way as to be able of seeing the two sighting marks $l^0$ as coinciding in succession with the different pairs of image-points, corresponding to those lines on the photograms. If it be desired to trace in plan lines lying at one and the same height, the slide $A^1$ must be fixed with the aid of the set screw $a^1$ in such a manner that its upper edge indicates on the scale $a^2$ the height, measured in the scale of the copy, of the said height with reference to that horizontal plane which during the exposure of the photograms contains the front principal point of the right-hand objective.

If the dimensions be suitably selected, the above described device admits of utilizing photograms, during the exposure of which the objective axes experienced an upward or downward inclination up to 45° towards the horizontal plane. In order to also be able to utilize photograms, at the exposure of which the available angles of inclination of the objective-axes mounted up to 90°, the arrangement would have to be made in such a way that one of the two members of the drawing apparatus, e. g. the drawing board, instead of being rigidly connected to the slide $C^1$, as shown in the annexed drawing, could either be coupled to the slide $C^1$ (if these angles of inclination amounted up to 45°), or to the slide $A^1$ (if those angles of inclination amounted to from 45° to 90°). In that case the slides $A^1$ and $C^1$ would exchange their functions as height slides and as depth-slides. In the first case it would be necessary to adjust on the scales $i^2$ and $i^5$ as well as on the scales $e^6$ and $e^7$ for the values as above described. In the second case, however, the values to be adjusted for would have to be computed according to the exchange of height and depth.

If, in addition, the member of the drawing apparatus affected by the slide $B^1$, instead of being fixed on the latter, as shown in the drawing, would be connected to the slide $B^1$ by means of a coupling, it would be possible, without altering the adjustment of the slides $e^1$, $e^2$ and $j$, to change the scale of the drawing by the insertion of gear systems.

I claim:

1. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

2. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis, and participates in changes of inclination of the line determined by the mark system and the principal point of the said objective, facing the mark system, the optical axis of this lens system and this line almost coinciding with one another.

3. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each objective and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

4. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted, which consists of several members and is universally supported rotatably about a point coinciding with the principal point of the lens system, facing the mark system, independently of the position occupied at any one time by the members of the lens system relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

5. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool point on the copy-carrier, between each photogram and the mark system a lens system being inserted, which consists of several members and is universally supported rotatably about a point coinciding with the principal point of the lens system, facing the mark system, and with the principal point, facing the mark system, of the appertaining objective, independently of the position occupied at any one time by the members of the lens system relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undesgoes a displacement in the direction of its optical axis.

6. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, whereby the mark system and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

7. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, whilst the third slide carries the two members of the mark, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

8. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, whilst the third slide carries the two members of the mark and the distance apart of the pair of photo-carriers and of the pair of members of the mark being adjusted by the bottom slide of the cross-slide system, the members of one of these two pairs being displaceably disposed relatively to each other in the direction of displacement of the top slide of the cross-slide system and the members of one of these two pairs in the direction of displacement of the third slide.

9. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, each in Cardan suspension in such a way that its Cardan centre nearly coincides with the principal point of the appertaining objective, facing the mark system, whilst the third slide carries the two members of the mark and the distance apart of the pair of photo-carriers and of the pair of members of the mark being adjusted by the bottom slide of the cross-slide system, the members of one of these two pairs being displaceably disposed relatively to each other in the direction of displacement of the top slide of the cross-slide system and the members of one of these two pairs in the direction of displacement of the third slide.

10. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, whilst the third slide carries the two members of the mark and the distance apart of the pair of photo-carriers and of the pair of members of the mark being adjusted by the bottom slide of the cross-slide system, firstly the members of one of these two pairs being displaceably disposed relatively to each other in the direction of displacement of the bottom slide of the cross-slide system, further the members of one of these two pairs being displaceably disposed relatively to each other in the direction of displacement of the top slide of the cross-slide system, and finally the members of one of these two pairs being displaceably disposed in the direction of displacement of the third slide.

11. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, each in Cardan suspension in such a way that its Cardan centre nearly coincides with the principal point of the appertaining objective, facing the mark system, whilst the third slide carries the two members of the mark and the distance apart of the pair of photo-carriers and of the pair of members of the mark being adjusted by the bottom slide of the cross-slide system, the members of one of these two pairs being displaceably disposed relatively to each other in the direction of displacement of the top slide of the cross-slide system and the members of one of these two pairs in the direction of displacement of the third slide, furthermore of that of these two pairs in which the direction of the relative adjustment of the two members coincides with the direction of displacement of that slide which adjusts the relative displacement of the space mark, corresponding to the two members of the mark with binocular observation and of the spatial form corresponding to both photograms, in the breadth-direction of this form, each of the two members being adjustably disposed.

12. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram and being rotatable about an axis which coincides with the optical axis of this objective, a binocular observation system, a mark system, whereby the latter and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis.

13. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, whereby the mark system and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis, each half of the binocular observation instrument containing between the appertaining member of the mark system and the ocular a reflector system, consisting of two groups of reflectors disposed in succession, which are both connected with the appertaining member of the mark system, viz. the front one in Cardan suspension in such a way that its Cardan centre contains this member of the mark system, whilst the rear group of reflectors is supported rotatably about a single axis, coinciding with the external Cardan axis of the front group of reflectors, whereby the two groups of reflectors are coupled with each other for uniform rotations about this common axis of rotation and the position of the reflecting surfaces is so chosen that the line determined by the said member of the mark system and the principal point of the appertaining objective, facing the mark system, on leaving the rear group of reflectors, is parallel to the axis of rotation of this group of reflectors.

14. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system, consisting of two members which during the copying are so disposed at a fixed distance apart that each of them can only be seen in the binocular observation system as coinciding with one of the two photograms, whereby the mark system and the pair of photo-carriers are disposed in space displaceably relatively to each other, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis, each half of the binocular observation instrument containing between the appertaining member of the mark system and the ocular a reflector system, consisting of two groups of reflectors disposed in succession, which are both connected with the appertaining member of the mark system, viz. the front one in Cardan suspension in such a way that its Cardan centre contains this member of the mark system, whilst the rear group of reflectors is supported rotatably about a single axis, coinciding with the external Cardan axis of the front group of reflectors, whereby the two groups of reflectors are coupled with each other for uniform rotations about this common axis of rotation and the position of the reflecting surfaces is so chosen that the line determined by the said member of the mark system and the principal point of the appertaining objective, facing the mark system, on leaving the rear group of reflectors, is parallel to the axis of rotation of this group of reflectors, an erecting prism being inserted into the path of rays of each half of the observation instrument and so coupled to both groups of reflectors as to undergo a rotation through half the angle in the event of rotations of the front group of reflectors about its internal Cardan axis as well as with rotations of both groups of reflectors about their common axis of rotation.

15. In a device for copying the surface, to be obtained from a pair of photograms, of a spatial form, a copying device containing a copy-carrier and a tool which are movable relatively to each other at least within a plane, two photo-carriers, each adapted to carry one of the two photograms and an objective destined to be disposed in the centre of projection of the appertaining photogram, a binocular observation system, a mark system consisting of two members which during the copying are so disposed at a fixed distance apart that each of them can only be seen in the binocular observation system as coinciding with one of the two photograms, three slides adapted to be actuated by the observer, two of the directions of displacement of these slides being perpendicular to each other and the third perpendicular to the two others, two of these slides being united to a cross-slide system, on the upper slide of which there are supported the two photo-carriers, whilst the third slide carries the two members of the mark, and means for transmitting the said relative displacements to the copying device in such a way that the mark system is seen by means of the said binocular observation system as coinciding at any one time with those two image-points which correspond on the two photograms to the object-point indicated by the tool-point on the copy-carrier, between each photogram and the mark system a lens system being inserted and means being provided for, adapted to couple the lens system and the mark system in such a way that at least one member of the lens system, dependent upon the distance of the mark system from the objective, appertaining to the respective photogram, undergoes a displacement in the direction of its optical axis, each half of the binocular observation instrument containing between the appertaining member of the mark system and the ocular a reflector system, consisting of two groups of reflectors disposed in succession, which are both connected with the appertaining member of the mark system, viz. the front one in Cardan suspension in such a way that its Cardan centre contains this member of the mark system, whilst the rear group of reflectors is supported rotatably about a single axis, coinciding with the external Cardan axis of the front group of reflectors, whereby the two groups of reflectors are coupled with each other for uniform rotations about this common axis of rotation and the position of the reflecting surfaces is so chosen that the line determined by the said member of the mark system and the principal point of the appertaining objective, facing the mark system, on leaving the rear group of reflectors, is parallel to the axis of rotation of this group of reflectors, an erecting prism being inserted into the path of rays of each half of the observation instrument and so coupled to both groups of reflectors as to undergo a rotation through half the angle in the event of rotations of the front group of reflectors about its internal Cardan axis as well as with rotations of both groups of reflectors about their common axis of rotation, the third of the three slides to be actuated by the observer adjusting the displacement of the space mark, corresponding to both members of the mark with binocular observation, relatively to the spatial form corresponding to the two photograms, in the breadth-direction of this form, an arrangement of link-prisms being inserted into the path of rays between each rear group of reflectors and the appertaining ocular.

WALTHER BAUERSFELD.

Witnesses:
PAUL KRUGER,
FRITZ LANDER.